(12) United States Patent  
Konop

(10) Patent No.: US 8,172,438 B2
(45) Date of Patent: May 8, 2012

(54) LOW-PROFILE COLLAPSIBLE LIGHTING SYSTEM

(75) Inventor: Chad Konop, Oshkosh, WI (US)

(73) Assignee: Magnum Power Products, LLC, Waukesha, WI (US)

( * ) Notice: Subject to any disclaimer, the term of this patent is extended or adjusted under 35 U.S.C. 154(b) by 179 days.

(21) Appl. No.: 12/608,805

(22) Filed: Oct. 29, 2009

(65) Prior Publication Data

US 2010/0220489 A1 Sep. 2, 2010

Related U.S. Application Data

(60) Provisional application No. 61/109,266, filed on Oct. 29, 2008.

(51) Int. Cl.
*B60Q 1/00* (2006.01)

(52) U.S. Cl. .......................... 362/485; 362/523; 362/192

(58) Field of Classification Search .................. 362/459, 362/485, 523, 192
See application file for complete search history.

(56) References Cited

U.S. PATENT DOCUMENTS

| RE30,000 | E | * | 5/1979 | Loffler et al. | 362/233 |
|---|---|---|---|---|---|
| 4,220,981 | A | * | 9/1980 | Koether | 362/486 |
| 6,517,225 | B1 | * | 2/2003 | Allen et al. | 362/485 |
| 6,805,462 | B1 | * | 10/2004 | Smith et al. | 362/192 |

* cited by examiner

*Primary Examiner* — David V Bruce
(74) *Attorney, Agent, or Firm* — Brian G. Gilpin; Godfrey & Kahn, S.C.

(57) ABSTRACT

A portable lighting system includes a power pack, a fuel tank and a collapsible mast mounted to a trailer. A lighting fixture with one or more lighting elements is mounted to a distal end of the mast. The mast may be placed in a lowered position for transportation or placed in a raised position for illumination of a desired area.

4 Claims, 12 Drawing Sheets

LOW-PROFILE COLLAPSIBLE LIGHTING SYSTEM

CROSS-REFERENCE TO RELATED APPLICATION

The present application claims priority to U.S. Provisional Application Ser. No. 61/109,266, filed on Oct. 29, 2008, the disclosure of which is incorporated herein by reference.

BACKGROUND

Conventional transportable lighting systems have been mounted to trailers for easy mobility. These lighting systems are also known to include an on-board power source so that the system is essentially self-contained. Such lighting systems can be moved to a desired location and setup to provide lighting as needed in locations where power and/or lighting sources may be neither easy to access or available at all. On-board power sources for larger lighting systems, such as might be used to illuminate a job site or other location, may be generators coupled to a prime mover such as an internal combustion engine. Such on-board power sources may be configured to not only provide power to the integrated lighting but may also be configured to provide connections to power other devices at the illuminated site or location.

While conventional systems so configured are known, there are certain aspects of these conventional designs to which improvements are desirable.

BRIEF DESCRIPTION OF THE DRAWINGS

The accompanying drawing figures, which are incorporated in and constitute a part of the description, illustrate several aspects of the invention and together with the description, serve to explain the principles of the invention. A brief description of the figures is as follows.

DETAILED DESCRIPTION

Figure 1:
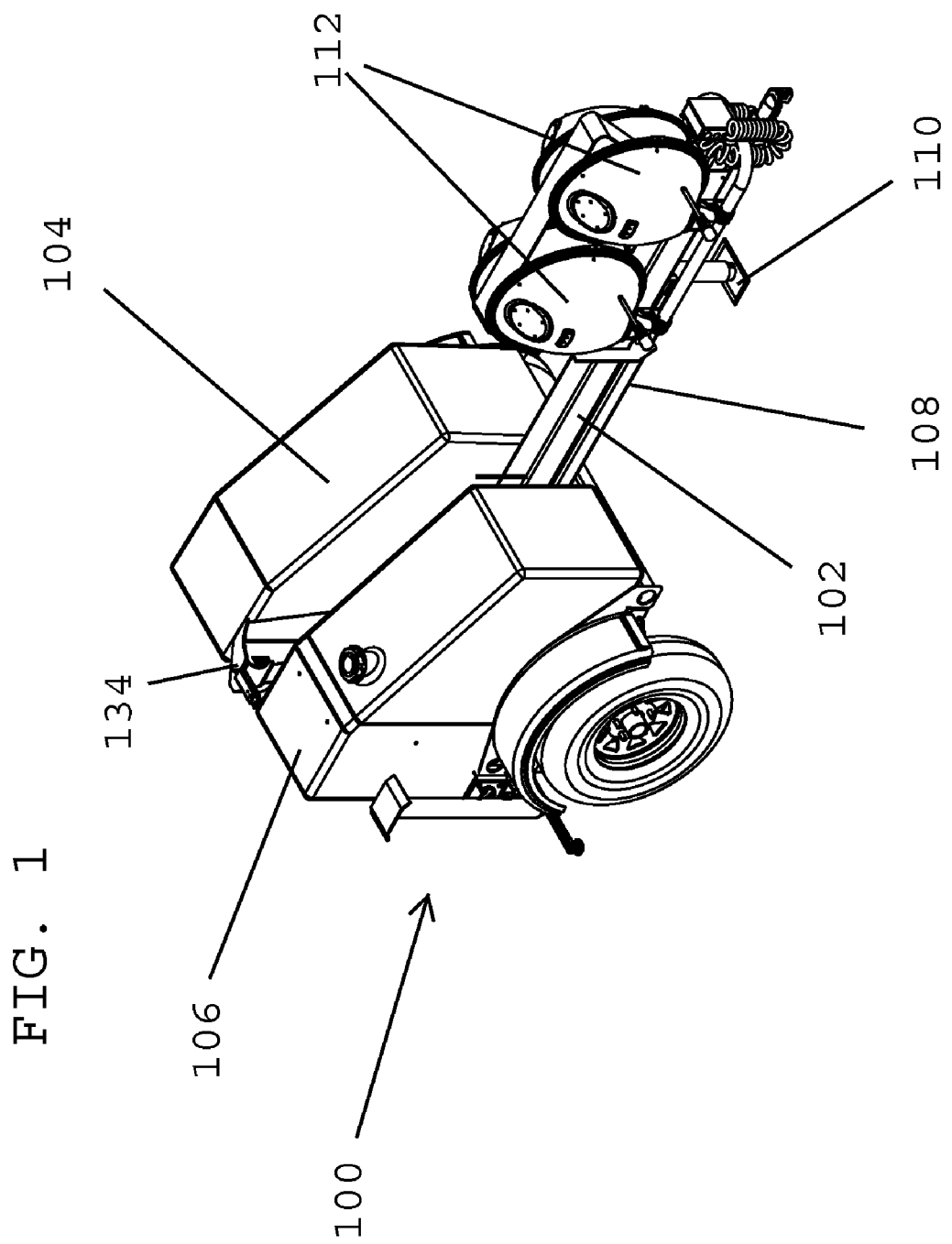
FIG. 1 is a first perspective view of a portable lighting system according to the present disclosure, with the lighting system configured for transportation.
Figure 2:
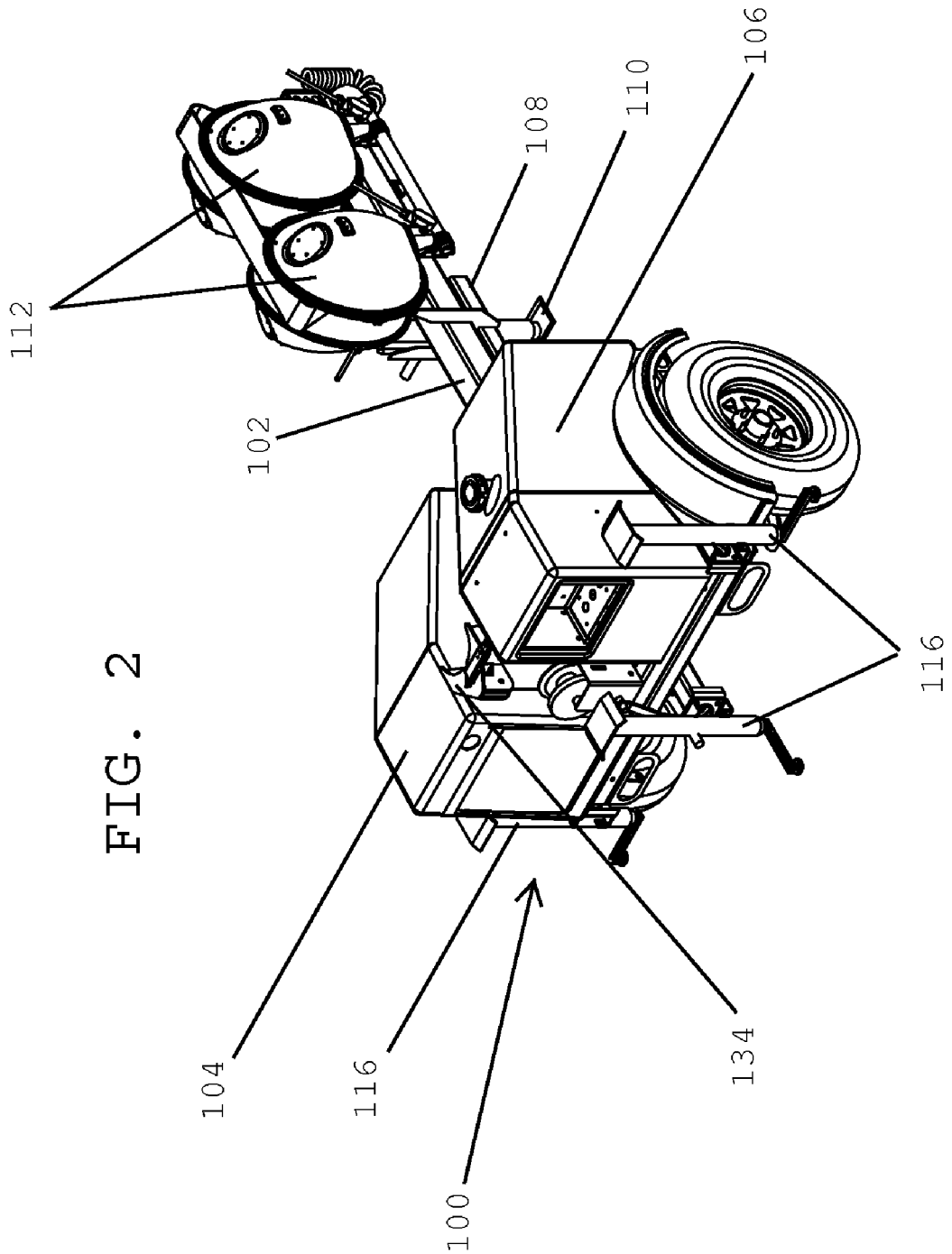
FIG. 2 is a second perspective view of the lighting system of FIG. 1
Figure 3:
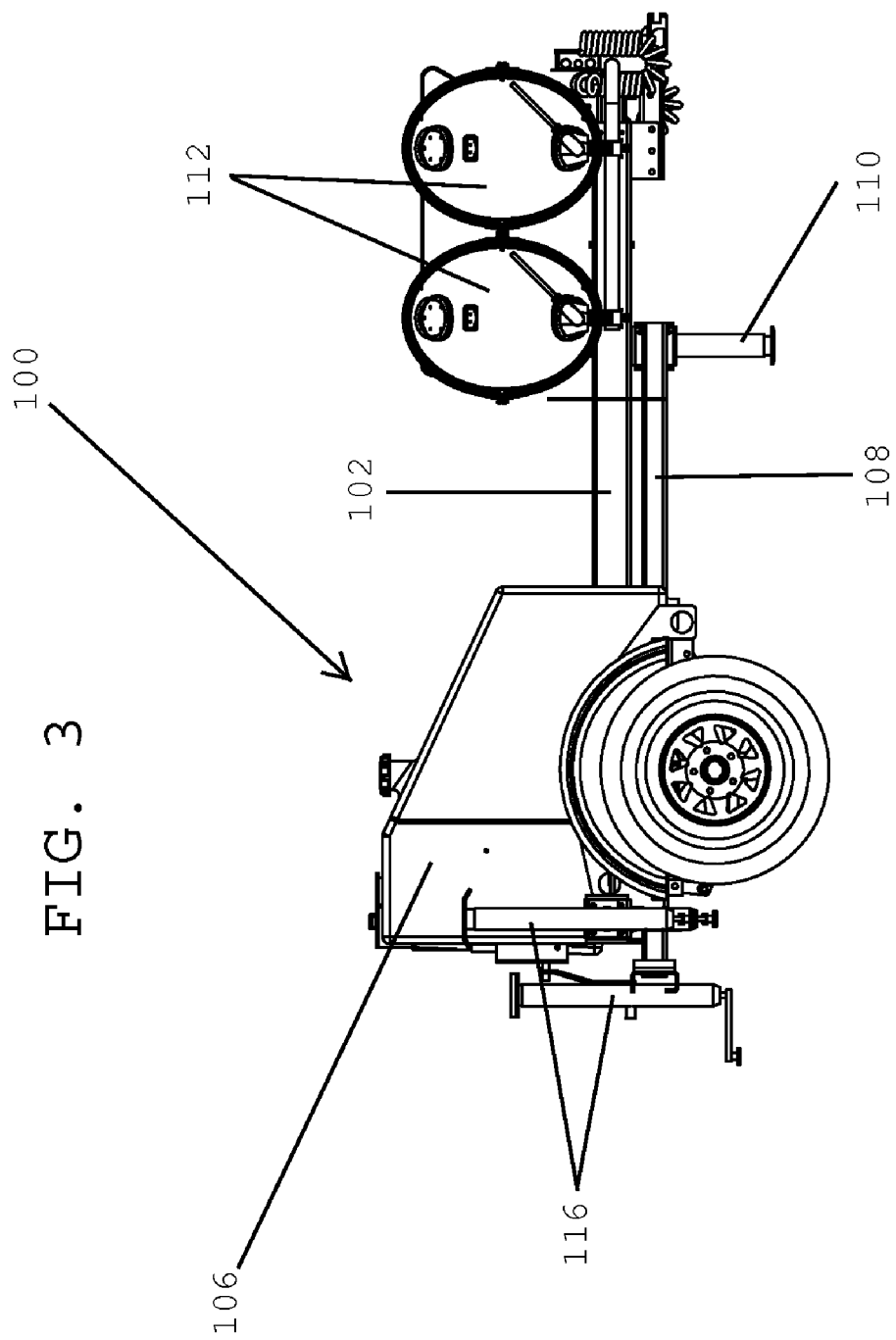
FIG. 3 is a first side view of the lighting system of FIG. 1.
Figure 4:
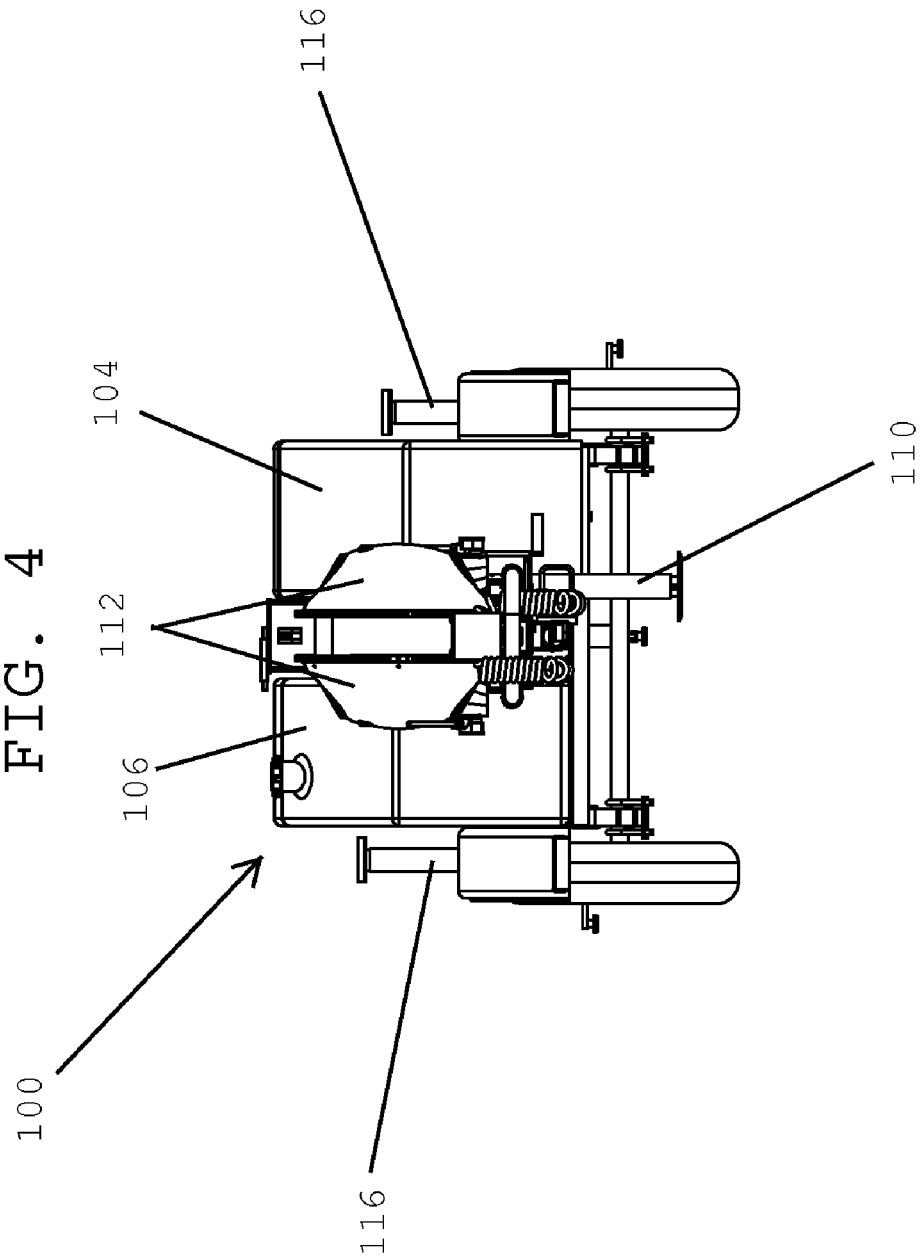
FIG. 4 is a hitch end view of the lighting system of FIG. 1.
Figure 5:
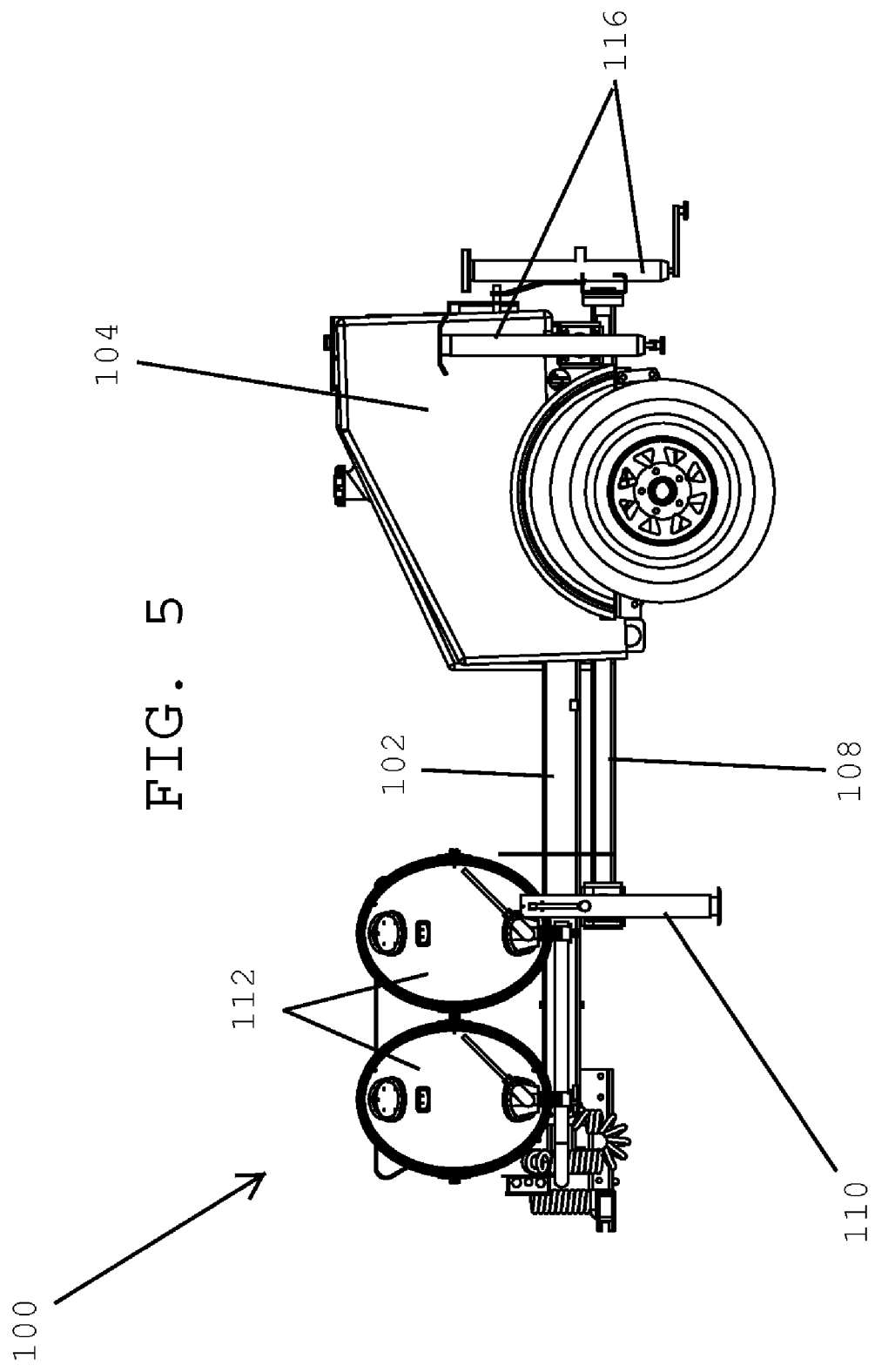
FIG. 5 is a second side view of the lighting system of FIG. 1.
Figure 6:
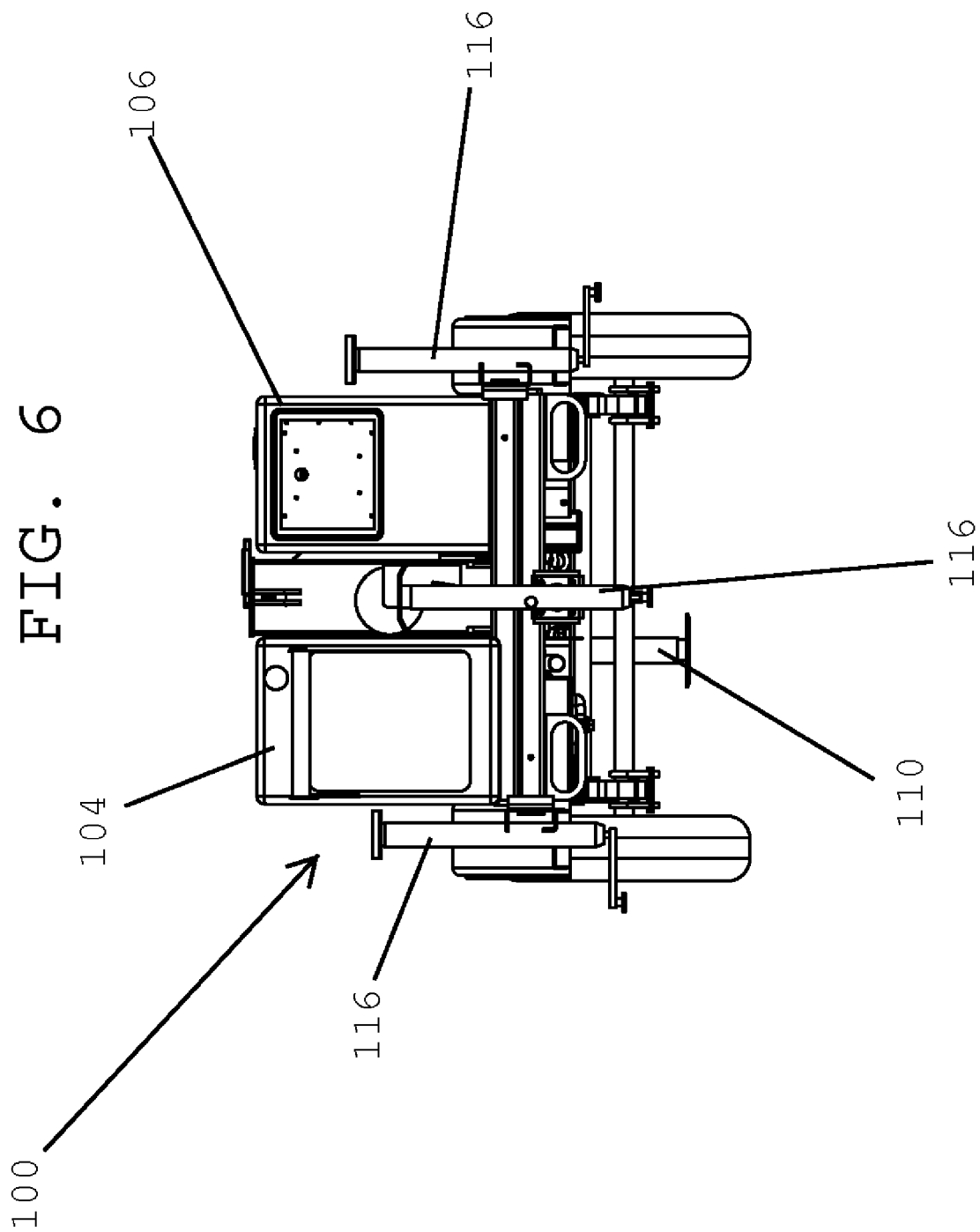
FIG. 6 is a rear end view of the lighting system of FIG. 1.

As shown in FIGS. 1 to 6, a lighting system 100 incorporates a collapsible lighting assembly 102 with a generator and internal combustion engine assembly 104, a fuel tank and system controller assembly 106 and a frame and support assembly that may be retracted as shown to permit movement of the system. Lighting assembly 102 is configured to lay closely along a lower frame element 108 extending between assembly 104 and assembly 106. Lighting assembly 102 may include an extendable/retractable mast 114 that may be pivotably mounted between assemblies 104 and 106.

A retractable support 110 is mounted to a forward end of frame element or central member 108. A plurality of light fixtures 112 may be mounted to a distal end of mast 114 opposite the pivotable mounting. When positioned as shown in FIGS. 1 to 6, the highest vertical portion of fixtures 112 may be at or below the highest point of one or both of assemblies 104 and 106. Such a positioning permits a low profile towing configuration to be achieved. Lower profile towing configurations may provide a lower center of gravity of the towed lighting system and may also provide a greater fuel efficiency during towing by having a reduced frontal cross-section.

Conventional designs for transportable and collapsible lighting systems have had a centerline mounted power source (such as an engine/generator powerpack) inside an enclosure with a collapsible mast mounted to or extending across the top of the enclosure when in a transport position. In this configuration, the weight of the light and mast assembly is positioned relative high above the ground, even when collapsed in a transport position. An embodiment such as illustrated in the attached FIGS. provides for a much lower mounting position for the collapsed lighting mast. This lower positioning provides greater stability for the trailer and a reduced frontal cross-section which may in turn reduce cost of transportation (improved fuel efficiency for the transport vehicle) and permit moving the trailer through smaller openings for positioning the light to illuminate a particular site.

Figure 7:
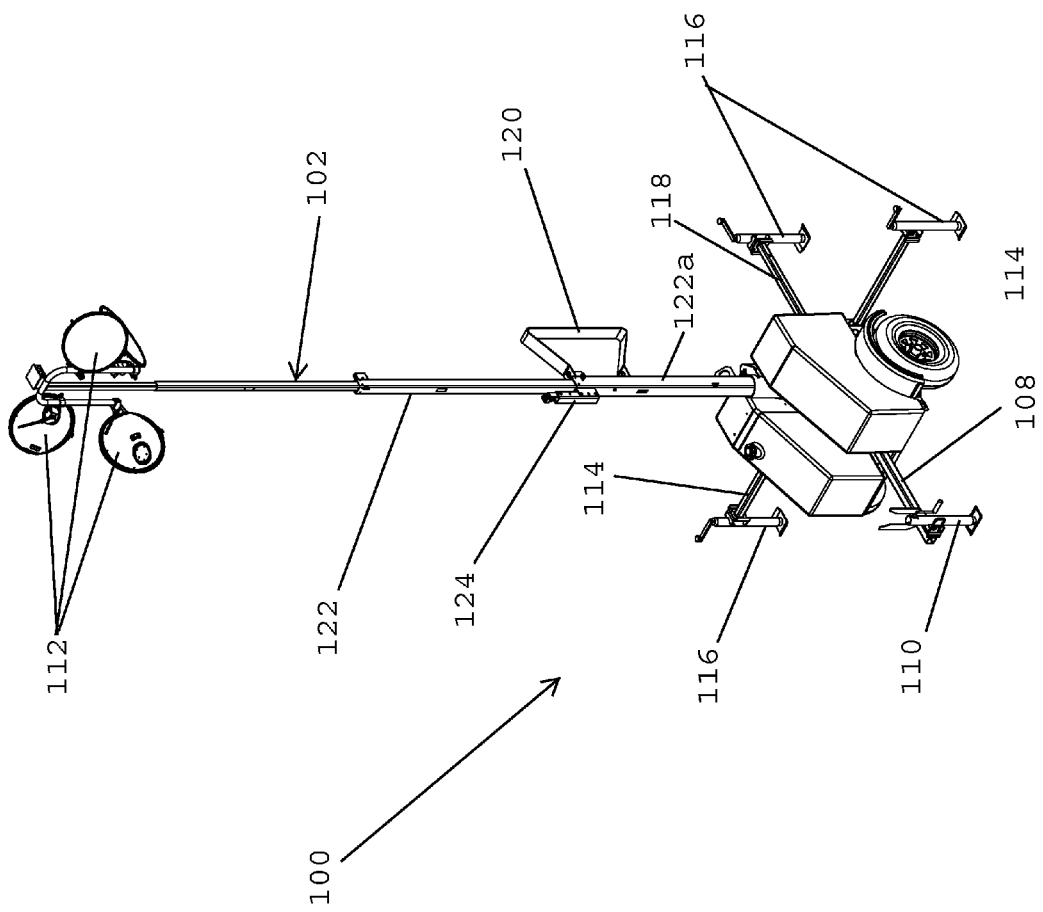
FIG. 7 is a first perspective view of the lighting system of FIG. 1, with the lighting system configured for illuminating a site.

Another advantage to having mast 122 (see FIG. 7 below) collapse to lie along lower member 108 for transportation is the possible reduction in structural supports and therefore weight. It is often desirable to have a trailer to be as light as possible to reduce towing weight and thus the size and power of the required towing vehicle. By having mast 122 mounted low to the framework of the trailer, there is no need to include structural members extended upward from the lower frame assembly to a top of the trailer for mounting the mast and light assembly. The assemblies 104 and 106 may be constructed with covers or shrouds which only need to provide shelter and protection to the internal components and do not need to be heavy enough to support the weight of the mast and light assembly. One advantage of such lower weight of the overall lighting system would be to keep the weight low enough to not trigger a requirement (regulatory or otherwise) to include brakes on the trailer itself.

Referring now to FIGS. 7 to 12, lighting system 100 is shown in a fully elevated position with light fixtures 112 deployed for use. Extendable frame elements 114 extend from sides of lighting system 100, each with a retractable support 116 mounted to a distal end. A rear extension 118 of lower frame element 108 extends to the rear of lighting system 100 and also includes a retractable support 116. Supports 116 may be pivoted from the transport position shown in FIGS. 1 to 6 to the deployed support position shown in FIGS. 7 to 12 once lighting system 100 is positioned as needed to illuminate a site. Alternatively, the supports 116 could be mounted to permit vertical adjustment of the units as opposed to having the lower legs pivot upward for transportation. This may be in place of or in addition to the ability of the lower legs and their attached feet 117 to be extended from within an upper outer housing 119.

As shown in FIGS. 7 to 12, lighting assembly 102 is extended vertically from its transport position adjacent to lower support member 108. With light fixtures 112 deployed for use, fixture support 120 is visible along a lower portion 122a of an extendable mast 122. Fixture support 120 and fixtures 116 are configured so that the fixtures may be secured to the support to limit movement and reduce possible damage to the fixtures during transportation. Also mounted to this lower portion 122a is a trailer hitch assembly 124 so that this hitch assembly is elevated from the ground and unable to be attached to a vehicle when the light tower is mast 122 is extended. Having the hitch assembly so mounted serves as a safety feature preventing movement of the lighting system when the mast is deployed. Once common cause of accidents and/or injury on jobsites can be accidental electrocution caused by workers on the ground coming into contact with overhead power lines. If the hitch assembly 124 is in the air away from attachment to a vehicle when the mast is elevated, a worker is prevented from moving lighting system 100 with mast 122 extended, reducing the possible contact with overhead power lines or other communications lines.

Elements 114 and extension 118 may be slidably mounted to lighting system 100 and expandable to provide an adequate width of support for mast 122 and lighting assembly 102 when fully vertically extended. The actual width of support required may be dependent on the weight and size of the mast and light fixtures and the maximum wind speed in which the mast is permitted to be extended. Supports 110 and 116 may be provided with extendable lower support legs and bases to engage the ground at varying distances below the ends of the elements 114 and extension 118. These will permit secure and level usage of lighting system 100 on uneven or irregular terrain.

Figure 8:
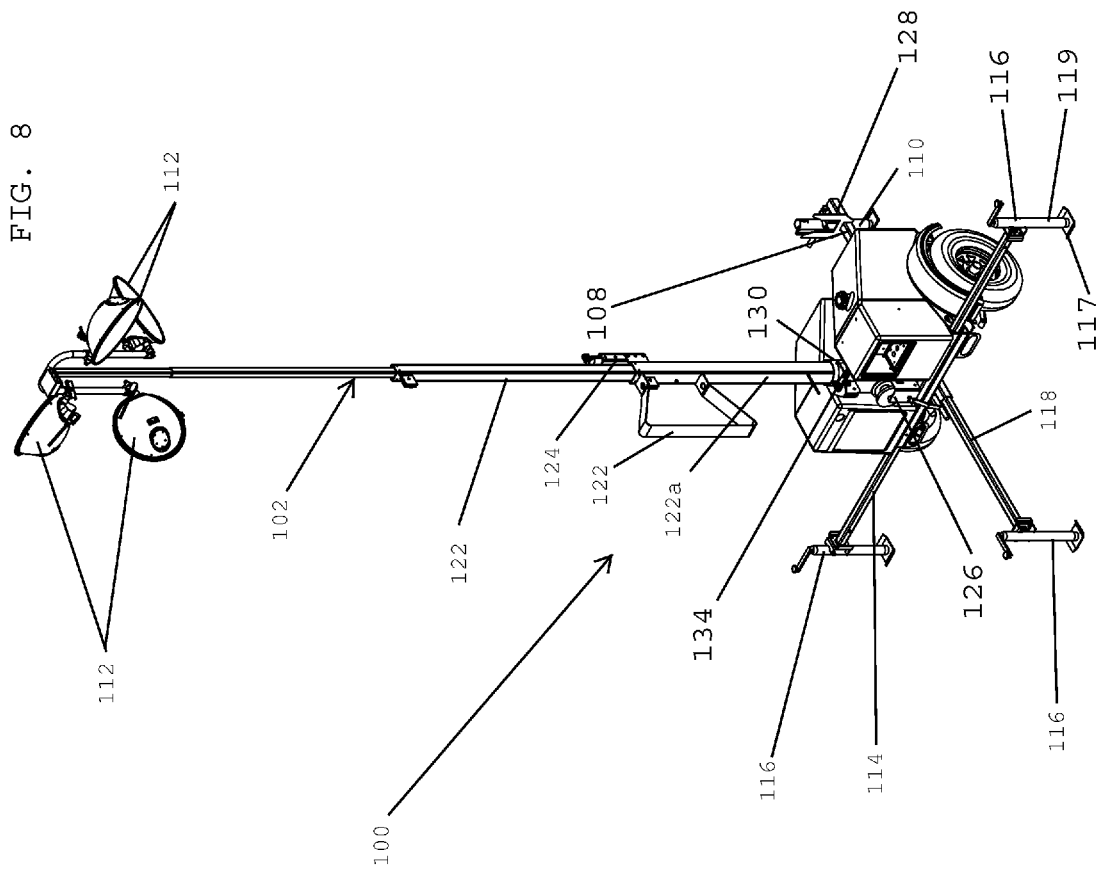
FIG. 8 is a second perspective view of the lighting system of FIG. 7.

Referring now to FIG. 8, a hand crank 126 may be provided to actuate the extension or lowering of mast 122 to a desired height. It is anticipated that other types of mechanical assists or other devices may be used to assist in the extension or retraction of mast 122. Lower member 108 may include a cradle 128 to receive mast 122 in a lowered and collapsed position and permit securing the mast and light assembly for transport. Since hitch 124 is attached to lower portion 122a of mast 122, it is desirable to have a secure and positive attachment between lower member 108 and mast 122 during transport.

Figure 9:
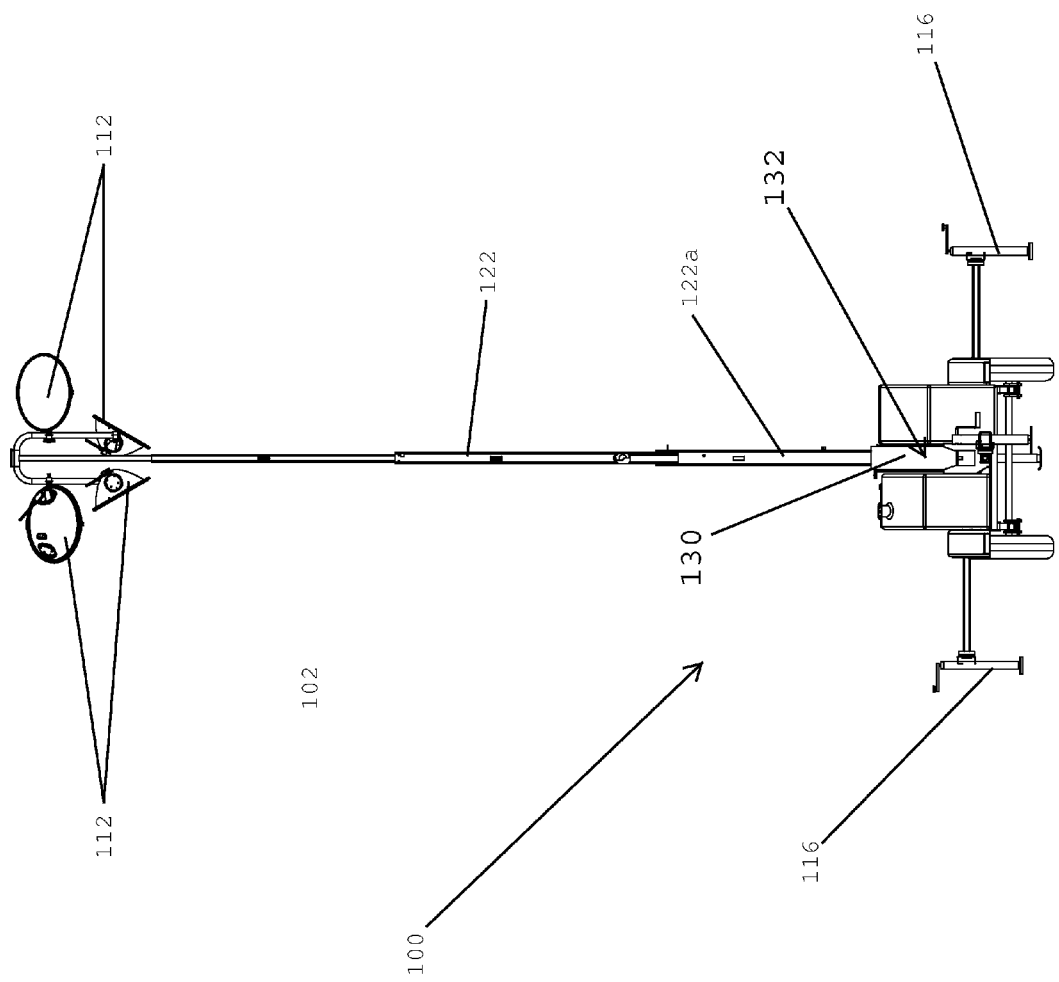
FIG. 9 is a hitch end view of the lighting system of FIG. 7.
Figure 10:
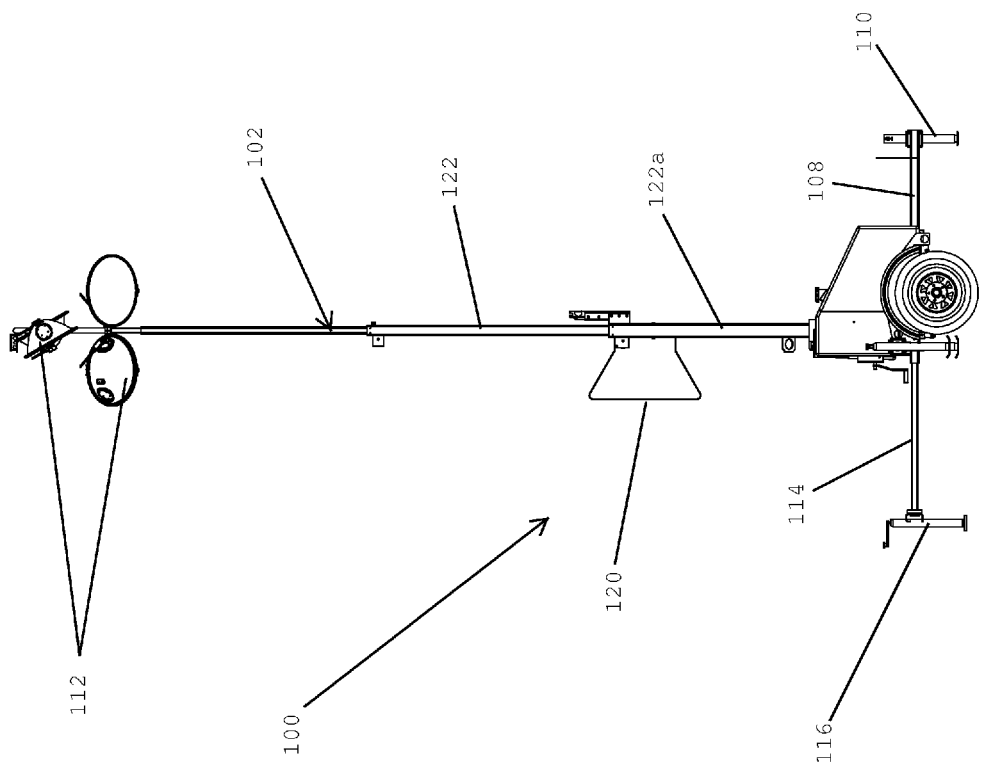
FIG. 10 is a first side view of the lighting system of FIG. 7.
Figure 11:
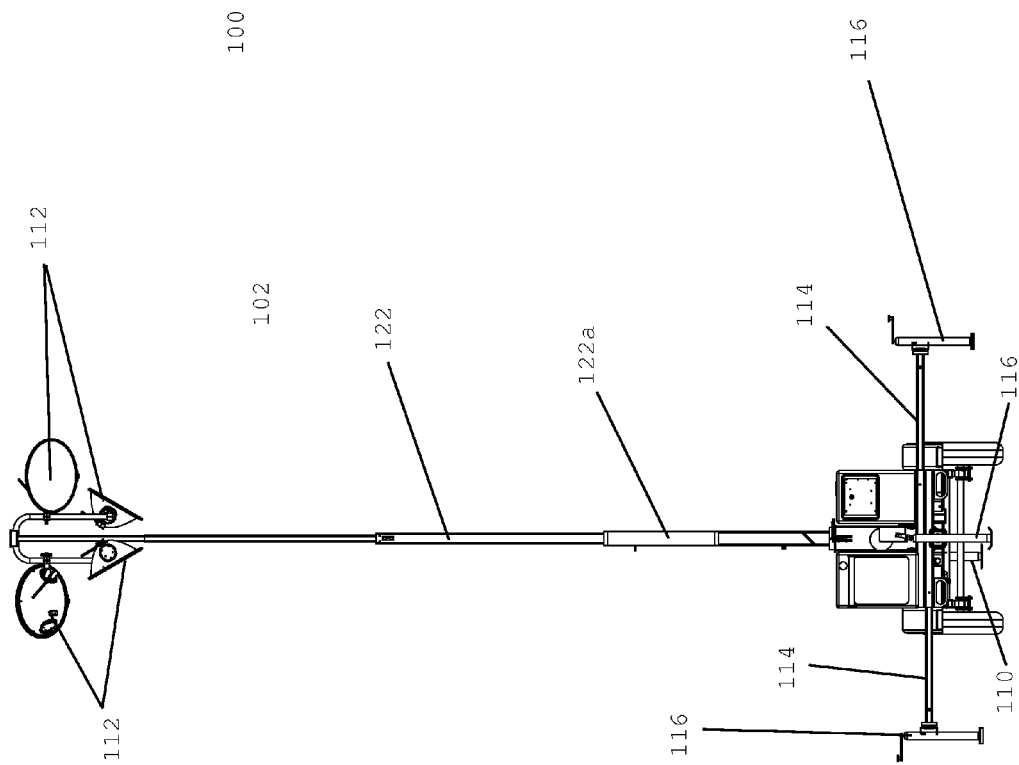
FIG. 11 is a rear end view of the lighting system of FIG. 7.
Figure 12:
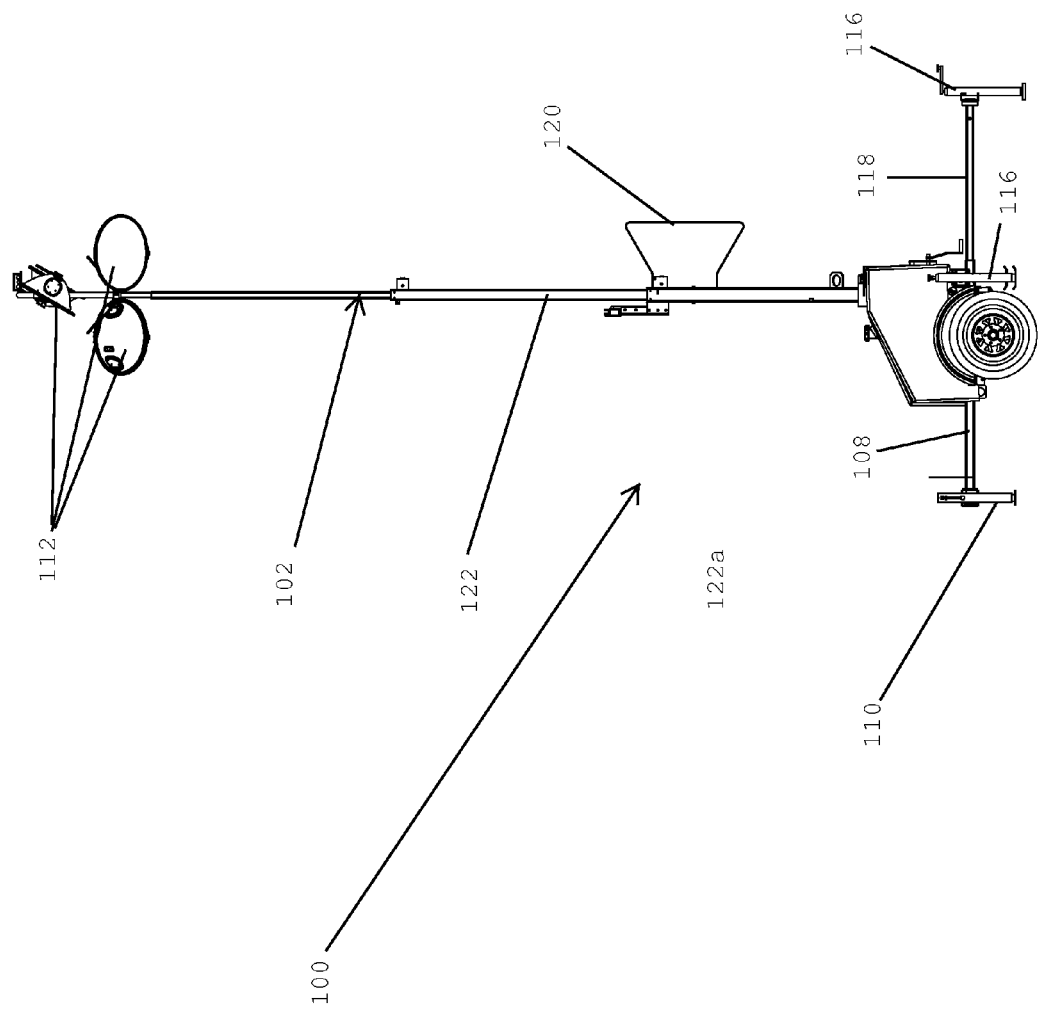
FIG. 12 is a second side view of the lighting system of FIG. 7.

As shown in FIGS. 8 and 9, lighting assembly 102 may be pivotably mounted between assemblies 104 and 106 and configured to rotate about a pivot axis positioned low between assemblies 104 and 106. A pivot support and assembly 132 may be provided for connection of mast 122 and also for mounting of crank 126. An upper support 134 for mast 122 may be provided to secure mast 122 in the vertical position for extension. As shown, mast 122 may be received within a sleeve 130 of assembly 132 to permit repair or replacement of mast 122 without requiring disassembly of the entire pivoting mounting structure. In addition, when new masts or light assemblies are desired to alter the nature of lighting provided by lighting system 100, mast 122 and the light fixtures may be more easily exchanged.

It is anticipated that crank 126 may be mounted to and movable with the pivoting assembly 132 if desired without straying from the present disclosure. An arrangement permitting a higher location for upper support 134 may also be provided where the support may be positioned higher than the upper extent of assemblies 104 and/or 106 along mast 122. Such an upwardly extended mounting may permit greater allowable vertical extension of mast 122 or may permit greater weight to be mounted to an upper end of mast 122.

Any description of the arrangement or grouping of components for the control and power generation elements of lighting system 100 within assemblies 104 and 106 is merely illustrative and is not intended to limit the disclosure to just the configuration shown. Components may be grouped into a single assembly with assembly 102 mounted alongside the combined assembly. Hitch 124 may be alternatively mounted to lower member 108 to provide a low profile transportation package but one which does not have the built-in safeguard against movement of the unit with the mast extended. A wide variety of general area lighting and/or spot lighting assemblies may be mounted to mast 122 as required for the particular site to be illuminated. A combination of diffused area lighting and spot lighting may be provided together on mast 122 as well.

Lighting system 100 may also be provided with auxiliary power outlets and inputs. The outlets could permit system 100 to be used as an auxiliary power source alone or in conjunction providing lighting for a site. Inputs would allow the lights of system 100 to be powered by external power in the event of the powerpack of system 100 going off line. In addition, some sites may have suitable and sufficient power to drive the lights of system 100 and may not permit the operation of the powerpack for noise or pollution reasons.

The embodiments of the inventions disclosed herein have been discussed for the purpose of familiarizing the reader with novel aspects of the present invention. Although preferred embodiments have been shown and described, many changes, modifications, and substitutions may be made by one having skill in the art without unnecessarily departing from the spirit and scope of the present invention. Having described preferred aspects and embodiments of the present invention, modifications and equivalents of the disclosed concepts may readily occur to one skilled in the art. However, it is intended that such modifications and equivalents be included within the scope of the claims which are appended hereto.

What is claimed is:

1. A transportable lighting system comprising:
a trailer with a frame upon which are mounted a power pack with a prime mover and a generator, a fuel tank, a controller, and a collapsible mast;
the collapsible mast movable between a lowered transportation position and a raised illumination position;
the collapsible mast including at least one illumination fixture mounted adjacent a distal end of the mast, the fixture connected to the power pack to provide power to operate the fixture;
wherein when the mast is in the lowered position, the mast lies generally along the frame of the trailer alongside the power pack;
the mast further including a lower section to which is mounted a hitch assembly, wherein the hitch is accessible for attachment to a vehicle for moving the trailer when the mast is in the lowered position and the hitch is rendered inaccessible when the mast in is the raised position.

2. A transportable lighting system comprising:
a trailer with a frame upon which are mounted a power pack with a prime mover and a generator, a fuel tank, a controller, and a collapsible mast;
the frame having a central member;

the power pack being mounted to the trailer on one side of the central member and the fuel tank being mounted to the other side of the central member;

the collapsible mast movable between a lowered transportation position and a raised illumination position;

the collapsible mast including at least one illumination fixture mounted adjacent a distal end of the mast, the fixture connected to the power pack to provide power to operate the fixture;

wherein when the mast is in the lowered position, the mast lies generally along the central member of the frame of the trailer and between the power pack and the fuel tank.

3. A transportable lighting system comprising:

a trailer with a frame upon which are mounted a power pack with a prime mover and a generator, a fuel tank, a controller, and a collapsible mast;

the collapsible mast movable between a lowered transportation position and a raised illumination position;

the collapsible mast including at least one illumination fixture mounted adjacent a distal end of the mast, the fixture connected to the power pack to provide power to operate the fixture;

wherein when the mast is in the lowered position, the mast lies generally along the frame of the trailer alongside the power pack and below a highest point of the trailer.

4. The lighting system of claim 3, further comprising one of the power pack and the fuel tank defining a highest point of the system when the mast is in the lowered position.

\* \* \* \* \*